United States Patent
Schöffner

(10) Patent No.: US 7,525,040 B2
(45) Date of Patent: Apr. 28, 2009

(54) ELECTRICAL POWER TRANSMISSION DEVICE HAVING A PHASE CONDUCTOR AND AN ENCASING CONDUCTOR

(75) Inventor: Günther Schöffner, Gaimersheim (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 11/660,235

(22) PCT Filed: Jul. 21, 2005

(86) PCT No.: PCT/EP2005/053549

§ 371 (c)(1),
(2), (4) Date: Feb. 13, 2007

(87) PCT Pub. No.: WO2006/018362

PCT Pub. Date: Feb. 23, 2006

(65) Prior Publication Data

US 2008/0093097 A1  Apr. 24, 2008

(30) Foreign Application Priority Data

Aug. 13, 2004  (DE) .................. 10 2004 040 247

(51) Int. Cl.
*H01B 7/00* (2006.01)
(52) U.S. Cl. ...................................... 174/24
(58) Field of Classification Search ................ 174/15.1, 174/15.4, 15.5, 19, 21 R, 24, 25 G
See application file for complete search history.

(56) References Cited

U.S. PATENT DOCUMENTS 3,795,820 A * 3/1974 Eidinger .................. 307/147
3,869,562 A * 3/1975 Eidinger et al. ............ 174/15.6
3,919,626 A * 11/1975 Hermstein ................. 323/361
4,042,969 A * 8/1977 Nikaido et al. .............. 361/107

FOREIGN PATENT DOCUMENTS

GB    1028189    * 8/1963

* cited by examiner

*Primary Examiner*—William H Mayo, III
(74) *Attorney, Agent, or Firm*—Laurence A. Greenberg; Werner H. Stemer; Ralph E. Locher

(57) ABSTRACT

An electrical power transmission device has a phase conductor and an encasing conductor. The phase conductor is used for transmission of an electrical power flow. The encasing conductor is divided into a plurality of sections, and the sections are connected by way of at least one assembly with a variable impedance.

22 Claims, 3 Drawing Sheets

ELECTRICAL POWER TRANSMISSION DEVICE HAVING A PHASE CONDUCTOR AND AN ENCASING CONDUCTOR

BACKGROUND OF THE INVENTION

Field of the Invention

The invention relates to an electrical power transmission device having a phase conductor and an encasing conductor, the phase conductor being used for transmission of an electrical power flow.

An electrical power transmission device such as this is known, for example, from Patent Specification U.S. Pat. No. 5,530,200. The electrical power transmission device there is in the form of a gas-insulated electrical line. The phase conductor is surrounded by an encasing conductor, which is gas-tight. The interior of the encasing conductor is filled with an insulating gas at a raised pressure. By virtue of their physical design, gas-insulated electrical lines such as these have a low impedance. A load flow and/or a specific distribution of power flows are/is controlled by means of the line impedances within a mesh-connected network of electrical power transmission lines. Gas-insulated electrical lines can influence the load flow in an undesirable manner when integrated in an existing network of electrical power transmission lines, because of their low impedance.

SUMMARY OF THE INVENTION

The invention is based on the object of designing an electrical power transmission device of the type mentioned initially, whose line impedance can be varied by simple design means.

According to the invention, in the case of an electrical power transmission device of the type mentioned initially, the object is achieved in that the encasing conductor is subdivided into a plurality of sections, and the sections are connected by means of at least one assembly having a variable impedance.

The introduction of a variable impedance into an encasing conductor makes it possible to influence the line impedance of the overall arrangement. Since the assembly having a variable impedance is inserted into the encasing conductor, the phase conductor which is intended for electrical power transmission is free of additional assemblies which would make the transmission impedance worse. A so-called return current is induced in the encasing conductor by induction effects. Although the magnitude of this return current corresponds to the phase current flowing in the phase conductor, its phase angle is, however, offset to about 180°. The magnetic fields which originate from the phase current and from the return current thus compensate for one another. This means that there is only a very small magnetic field caused by the electrical power transmission device outside the encasing conductor. The introduction of an assembly having a variable impedance results in coupling inductances, as a result of which the operating inductance (line impedance) of the electrical power transmission device changes. It is possible to provide for the assembly having a variable impedance to have a very low impedance such that there is scarcely any adverse effect on the operating inductance of the electrical power transmission device during normal operation. The assembly having a variable inductance can also be used to produce a specific load flow in a network. The operating inductance can be deliberately set such that a load current is distributed over other network paths as well.

An advantageous refinement makes it possible to provide for at least one, and in particular each section of the encasing conductor to be grounded with the interposition of an assembly having a variable impedance.

If, now, in addition to the connection of individual sections of the encasing conductor via an assembly having a variable impedance, individual sections of the encasing conductor are grounded via an assembly having a variable impedance, then it is additionally possible to vary the operating impedance.

A further advantageous refinement makes it possible to provide for a plurality of sections of encasing conductors which are arranged parallel to be connected in an interposed form via at least one assembly having a variable impedance.

Interposed connection of a plurality of sections of encasing conductors is also known by the expression "cross bonding". The interposing process reduces the return current induced in the return line, since the return currents induced in the parallel encasing conductors have different phase angles. The reduction in the induced return current increases the operating inductance.

Furthermore, the problem on which the invention is based can also be solved for an electrical power transmission device of the type mentioned initially by the encasing conductor being grounded via an assembly having a variable impedance.

The use of an assembly having a variable impedance in a grounding path for the encasing conductor makes it possible on the one hand to achieve low-impedance grounding and on the other hand to achieve high-impedance grounding. This makes it possible for stray currents or fault currents to flow away to ground in simple or severe conditions. Deliberate control of the flow of currents away via the grounding points results in a variation of the operating inductance of the electrical power transmission device.

It is advantageously also possible to provide for the encasing conductor to in each case be grounded at an input end and at an output end of the power transmission device via assemblies having variable impedances.

If the encasing conductor is grounded at both ends, that is to say in each case via assemblies having variable impedances both with respect to the input and output end of the energy flow in the electrical power transmission device, then the operating inductance can be influenced in a finely graduated manner. Current can thus be assisted to flow away via the grounding points at specific points, while this is impeded at other points. Currents flowing away to ground potential are thus forced to follow specific paths along the encasing conductor so that, in consequence, the operating inductance of the electrical power transmission device can be varied to a greater or lesser extent.

A further advantageous refinement makes it possible to provide for the assembly having a variable impedance to be at least partially formed from a non-reactive resistance and/or from a reactance.

By way of example, capacitors or coils may be used as reactances. The use of a reactance makes it possible to influence the phase and magnitude of the short-circuit current. The use of purely non-reactive resistances makes it possible to influence the magnitude of the short-circuit current. Suitable interposition of different resistances, capacitors and coils thus makes it possible to influence the impedance differently. For example, when a short occurs, the impedance can thus be deliberately increased, so that this is limited.

Furthermore, it is advantageously possible to provide for the assembly having a variable impedance to be at least partially formed from an electronic component.

For example, electronic components make it possible to easily regulate the variable impedance. By way of example thyristor-controlled resistances can thus be used. Furthermore, further assemblies can also be used, such as converters. Electronic components in this case have the advantage that they can be quickly matched to changing conditions at the electrical power transmission device, in the feeding power supply system, or in a load.

It is advantageously also possible to provide for the assembly having a variable impedance to be at least partially formed from a current and/or voltage source.

By way of example, active sources can be used as current or voltage sources. Active sources allow additional currents to be deliberately introduced into the encasing conductor. This deliberate introduction of currents is used to vary the operating impedance of the electrical power transmission device.

A further advantageous refinement makes it possible to provide for an encasing conductor to surround, in particular to coaxially surround, a phase conductor.

The encasing conductor protects the phase conductor against direct external contact. Furthermore, an arrangement such as this ensures good inductive coupling, so that it is possible to induce a return current in the encasing conductor which compensates virtually completely for the magnetic field originating from the phase current in the phase conductor.

In this case, it is advantageously also possible to provide for the encasing conductor to be a pressure-resistant tube, at least in places.

A pressure-resistant tube can be used on the one hand as an electrical conductor for carrying the return current, while on the other hand this tube can be used to give the overall electrical power transmission device arrangement a robust external contour.

The invention will be described in more detail in the following text with reference to one exemplary embodiment, which is illustrated schematically in a drawing, in which:

DESCRIPTION OF THE PREFERRED EMBODIMENTS

Figure 1:
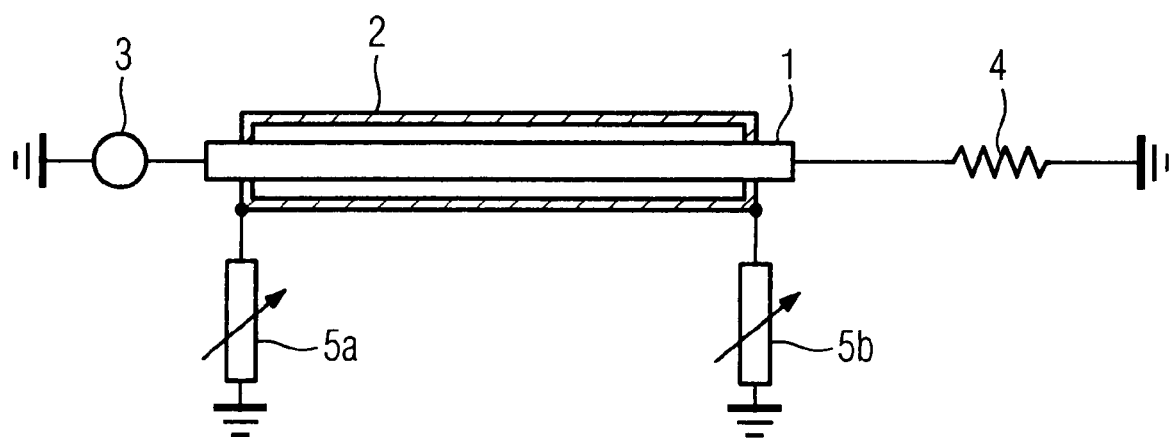
FIG. 1 shows a section through a gas-insulated line.

FIG. 1 shows a gas-insulated line, schematically in the form of a section. The gas-insulated line has a phase conductor 1 and an encasing conductor 2. The encasing conductor 2 surrounds the phase conductor 1. At the input end, the phase conductor 1 is connected to a feeding electrical power supply system 3. At the output end, the phase conductor 1 is connected to a load 4. A power flow can be transmitted via the phase conductor 1 from the electrical power supply system 3 to the load 4. The encasing conductor 2 of the gas-insulated electrical line is grounded both at the input end and at the output end, in each case via an assembly having a variable impedance 5a, 5b. The assemblies may have a resistive, capacitive or inductive character, depending on the requirement. Furthermore, the assemblies 5a, 5b can also include electronic components. The setting of the impedances of the assemblies having a variable impedance 5a, 5b makes it possible to dissipate return currents occurring in the encasing conductor to a greater or lesser extent. These return currents are produced, for example, by induction.

Figure 2:
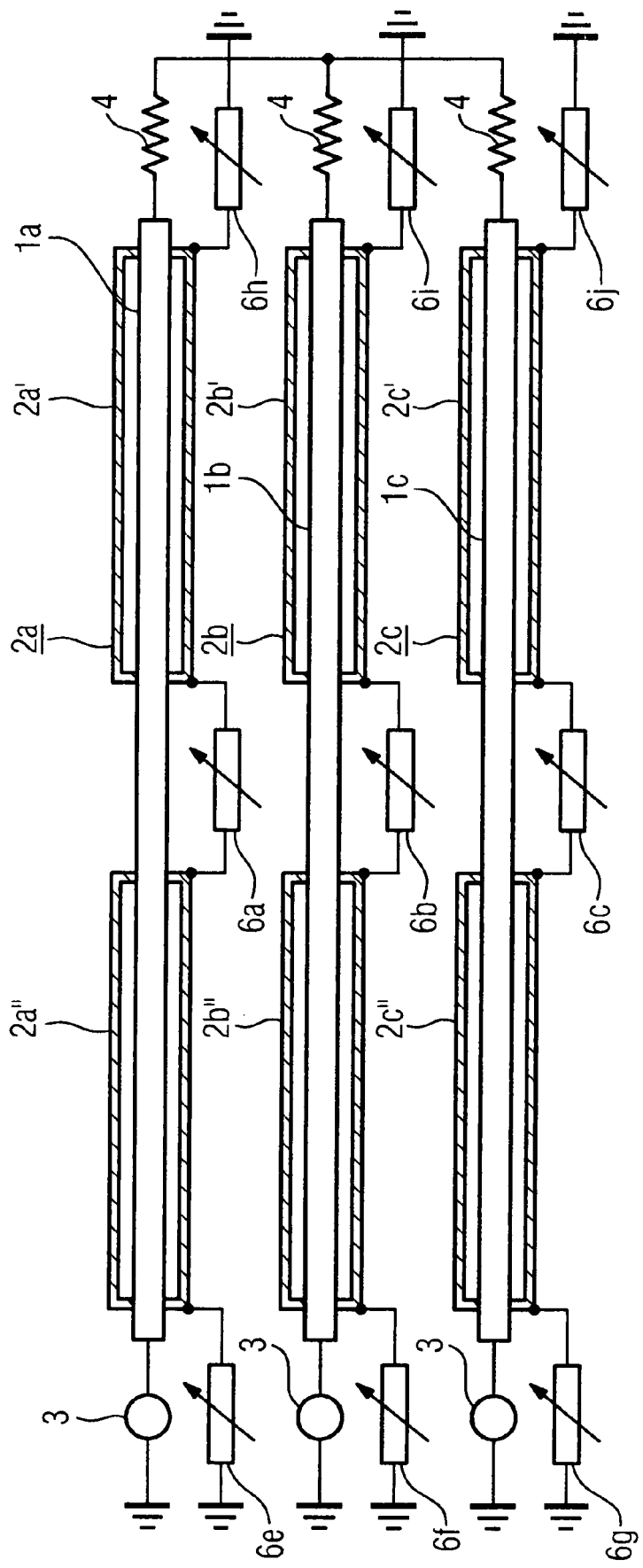
FIG. 2 shows a gas-insulated electrical line whose encasing conductor is subdivided into a plurality of sections.

FIG. 2 shows a further arrangement of an electrical power transmission device, which has three groups located parallel to one another, which are each formed from a phase conductor 1a, 1b, 1c and an encasing conductor 2a, 2b, 2c, respectively. The arrangement shown in FIG. 2 is used to transmit electrical power by means of a three-phase ac voltage system. The three-phase ac voltage system is provided by an electrical power generation system 3, and is transmitted via the phase conductors 1a, 1b, 1c to a load 4.

The encasing conductors 2a, 2b, 2c are respectively subdivided into two sections 2a', 2a'', 2b', 2b'', 2c', 2c''. The individual sections 2a', 2a'', 2b', 2b'', 2c', 2c'' of the encasing conductors 2a, 2b, 2c are respectively electrically conductively connected to one another with the interposition of an assembly having a variable impedance 6a, 6b, 6c. Furthermore, the sections are respectively grounded via an assembly having a variable impedance 6e, 6f, 6g, 6h, 6i, 6j. The assemblies having a variable impedance 6a, 6b, 6c, 6e, 6f, 6g, 6h, 6i, 6j may each be in the form of a capacitive, inductive or resistive element, or else an assembly with electronic components. By way of example, one such assembly is a converter or an electronic voltage and/or current source. The use of electronic components for the assemblies having a variable impedance allows rapid regulation and matching of the individual assemblies, depending on the particular operating state.

Figure 3:
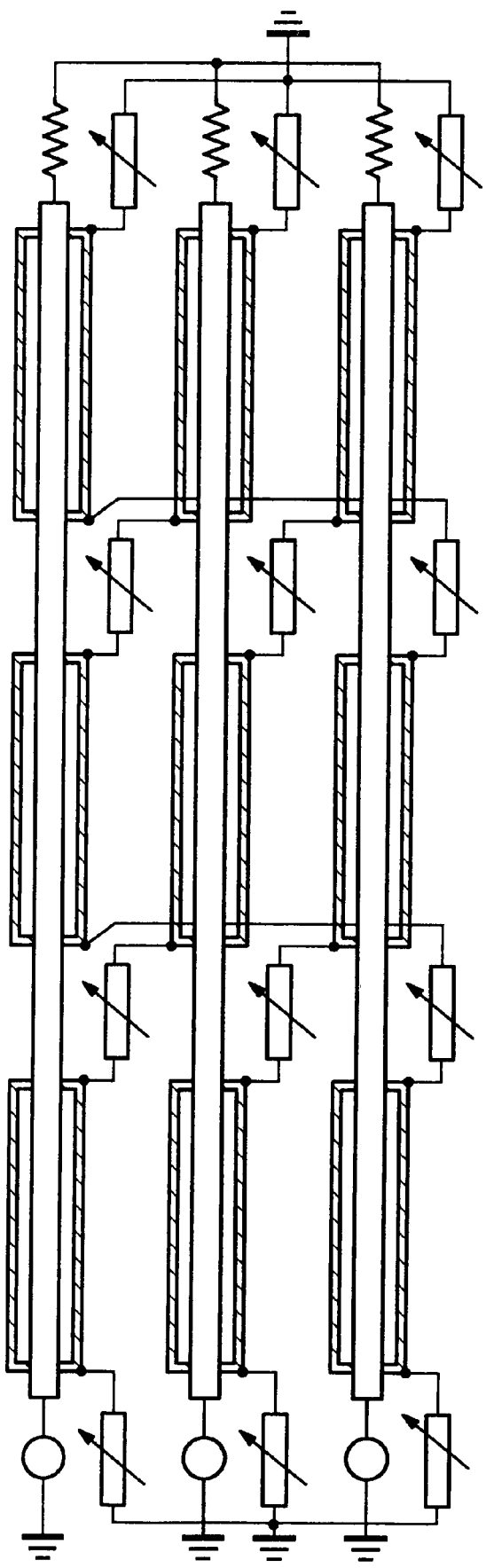
FIG. 3 shows a gas-insulated electrical line whose encasing conductor is subdivided into a plurality of sections, with the sections being connected in an interposed form to one another, with the interposition of assemblies having variable impedances.

FIG. 3 shows a further power transmission device, which is likewise used for transmission of electrical power by means of a three-phase ac voltage system. The encasing conductors for the individual phases are subdivided into a plurality of sections. The individual sections of individual phases are cyclically interposed with one another, with the interposition of assemblies having variable impedances. The respective input-end and output-end sections of the encasing conductors are grounded via assemblies having a variable impedance. The return current flowing in the sections of the encasing conductors, and hence the impedance of the overall arrangement, can easily be varied by appropriate regulation of the assemblies having a variable impedance.

In addition to the arrangements with assemblies having variable impedances as shown in FIGS. 1, 2 and 3, further solutions are also possible. For example, it is possible to split only the encasing conductor of a single phase or of two phases and to interpose one assembly having a variable impedance. Furthermore, the number of grounding points and the locations of the grounding points can be varied. If the individual line sections are cyclically interposed, it is also possible to provide for only individual sections to be connected to one another, or for any specific groups of sections to be cyclically interposed with one another.

I claim:

1. An electrical power transmission device, comprising:
a phase conductor configured to transmit an electrical power flow;
an encasing conductor divided into a plurality of sections, each section being inductively coupled to a portion of said phase conductor to induce a return current to flow in said section while current is flowing in said phase conductor; and
at least one assembly having a variable impedance connecting said sections of said encasing conductor to one another.

2. The electrical power transmission device according to claim 1, wherein at least one of said sections of said encasing conductor is connected to ground through an assembly having a variable impedance.

3. The electrical power transmission device according to claim 1, wherein each one of said sections of said encasing conductor is connected to ground through an assembly having a variable impedance.

4. The electrical power transmission device according to claim 1, wherein a plurality of said sections of said encasing conductor are connected in parallel, and connected in a crosswise connection via at least one assembly having a variable impedance.

5. The electrical power transmission device according to claim 1, wherein said at least one assembly having the variable impedance is at least partially formed of a non-reactive resistance.

6. The electrical power transmission device according to claim 1, wherein said at least one assembly having the variable impedance is at least partially formed of a reactance.

7. The electrical power transmission device according to claim 1, wherein said at least one assembly having the variable impedance is at least partially formed of an electronic component.

8. The electrical power transmission device according to claim 1, wherein said at least one assembly having the variable impedance is at least partially implemented as a current source and/or a voltage source.

9. The electrical power transmission device according to claim 1, wherein said encasing conductor is disposed to encase said phase conductor.

10. The electrical power transmission device according to claim 1, wherein said encasing conductor is disposed to coaxially surround said phase conductor.

11. The electrical power transmission device according to claim 1, wherein said encasing conductor is formed of one or more pressure-resistant tubes.

12. The electrical power transmission device according to claim 1, wherein said encasing conductor is pressure-resistant at least in places.

13. An electrical power transmission device, comprising:
a phase conductor configured to transmit an electrical power flow;
an encasing conductor inductively coupled to at least a portion of said phase conductor to permit a return current to flow in said encasing conductor while current is flowing in said phase conductor; and
an assembly having a variable impedance connecting said encasing conductor to ground 14. The electrical power transmission device according to claim 13, wherein the power transmission device has an input end and an output end, and said assembly includes two assemblies with variable impedance respectively connected to said encasing conductor at the input end and at the output end of the power transmission device.

15. The electrical power transmission device according to claim 13, wherein said assembly having the variable impedance is at least partially formed of a non-reactive resistance.

16. The electrical power transmission device according to claim 13, wherein said assembly having the variable impedance is at least partially formed of a reactance.

17. The electrical power transmission device according to claim 13, wherein said assembly having the variable impedance is at least partially formed of an electronic component.

18. The electrical power transmission device according to claim 13, wherein said assembly having the variable impedance is at least partially implemented as a current source and/or a voltage source.

19. The electrical power transmission device according to claim 13, wherein said encasing conductor is disposed to encase said phase conductor.

20. The electrical power transmission device according to claim 13, wherein said encasing conductor is disposed to coaxially surround said phase conductor.

21. The electrical power transmission device according to claim 13, wherein said encasing conductor is formed of one or more pressure-resistant tubes.

22. The electrical power transmission device according to claim 13, wherein said encasing conductor is pressure-resistant at least in places.

* * * * *